United States Patent [19]

Choi

[11] Patent Number: 4,809,867
[45] Date of Patent: Mar. 7, 1989

[54] DOOR OPENING/CLOSING DEVICE FOR ELECTRONIC APPLIANCES

[75] Inventor: Dong K. Choi, Suwon, Rep. of Korea
[73] Assignee: Goldstar Co., Ltd., Seoul, Rep. of Korea
[21] Appl. No.: 135,376
[22] Filed: Dec. 21, 1987
[30] Foreign Application Priority Data Dec. 23, 1986 [KR] Rep. of Korea ............... 20847/1986

[51] Int. Cl.⁴ .............................................. B65D 43/20
[52] U.S. Cl. .................................... 220/211; 220/346; 220/348
[58] Field of Search ............... 220/211, 262, 346, 347, 220/348

[56] References Cited

U.S. PATENT DOCUMENTS 4,057,167 11/1977 Lee ...................................... 220/348

*Primary Examiner*—Donald F. Norton
*Attorney, Agent, or Firm*—Birch, Stewart, Kolasch & Birch

[57] ABSTRACT

A door opening/closing device for use in electronic appliances such as a VCR, a TV set and audio products, which can easily open the door of an electronic appliance simply by pushing a locking-loosening button. The device comprises a door to open and close the front opening of the front panel of an electronic appliance and a rack gear formed in the inner side of the door, a pinion gear engaged with the rack gear and provided with a pair of integrated interlocking gears, a pair of driving gears engaged with the interlocking gears and provided with a spiral spring wound onto its axis, a locker for locking a catching projection of the door, a locking-loosening interlocking lever supported by a horizontal axis with its lower part coming into contact with the interlocking part of the door and a locking-loosening button for opening the door by pushing it.

3 Claims, 4 Drawing Sheets

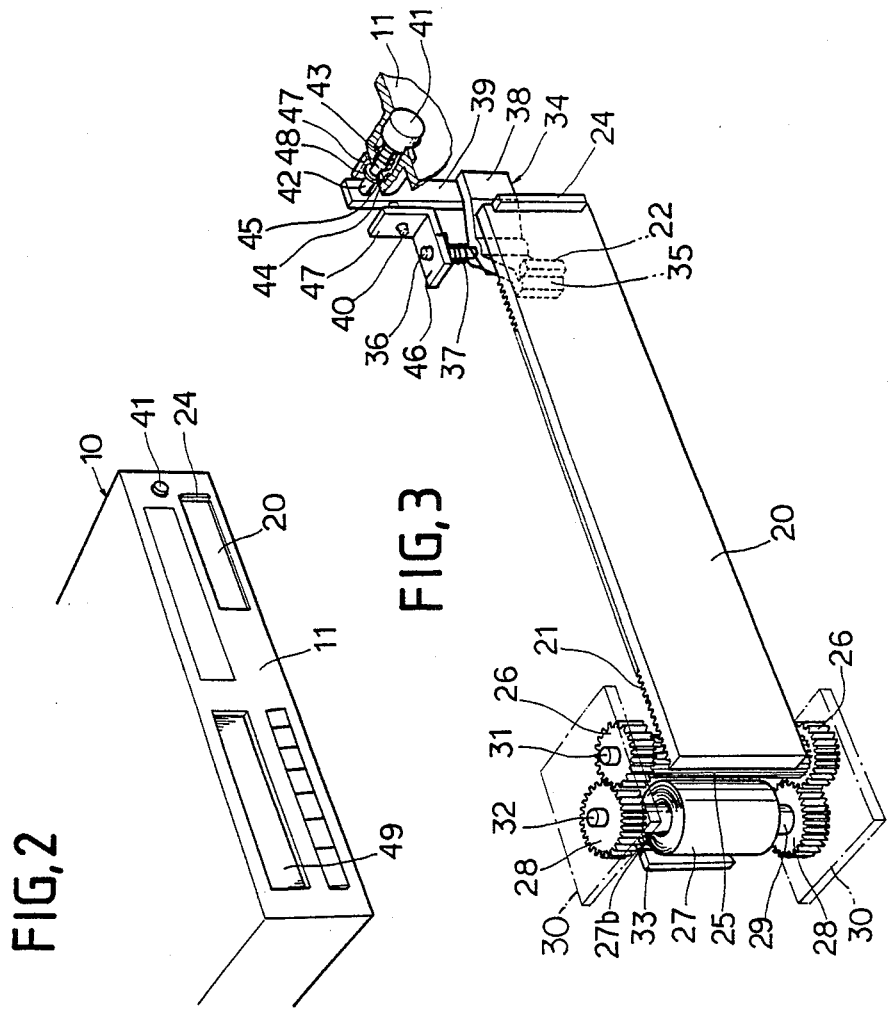

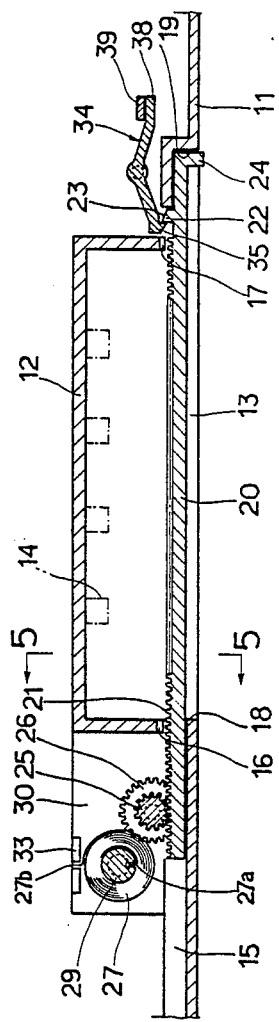
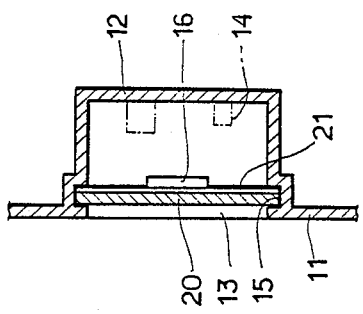
FIG. 4
FIG. 5

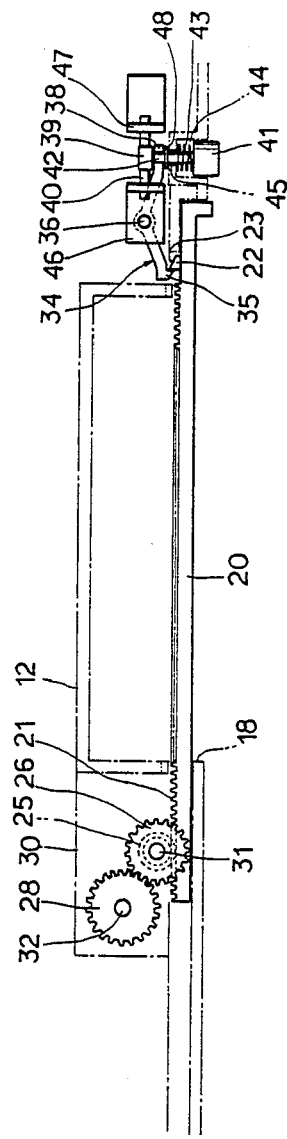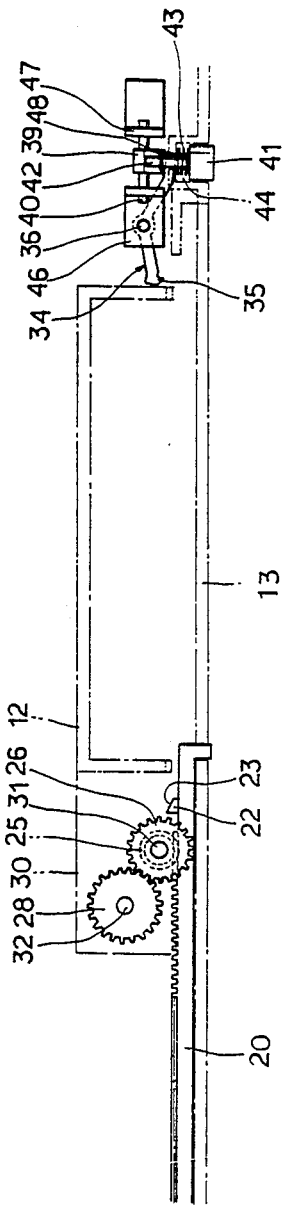

4,809,867

DOOR OPENING/CLOSING DEVICE FOR ELECTRONIC APPLIANCES

BACKGROUND OF THE INVENTION

1. Field of the Invention

The present invention relates to a door opening/closing device made available to open and close the front opening of a button box part where various buttons and knobs are placed in the front panel of electronic appliances such as a VCR, or a TV set and audio products and, more particularly to a door opening/closing device which makes it possible to open the door of an electronic appliance automatically and softly simply by pushing a locking-loosening button.

2. Description of the Prior Art

The prior electronic appliance comprises, as shown in FIG. 1, a control box part 102 where various buttons and knobs 103 are installed in the front panel 101 of its main body 100. The front opening 104 of this control box part 102 is made to open and close by a door 105. When such various buttons and knobs 103 are not used, they are protected by closing the door 105 and, when they are used, they are made to operate after opening the door 105.

The door 105 is constructed so as to move upward to open and move downward to close by connecting the hinge part 106 at its lower inner side to a hinge 107 formed in the interior of the main body 100 through an assembly hole 108 in the lower side of the front panel 101.

When the door 105 is closed by being pushed in an open condition, as shown by a chain line in FIG. 1, it comes to a stop with an elastic hook 109 projecting inwardly on the top of the door 105 caught by a jaw 110 formed on the upper rim of the opening 104 in the control box part 102, as shown by a real line in FIG. 1. When the door 105 is pulled forwardly under such a condition, it will open by turning about the hinge 105 while the elastic hook 109 moves out of the jaw 110, as shown by a chain line in FIG. 1.

In the case of the prior door opening/closing device, the elastic hook 109 is worn out easily as it comes into contact with the jaw 110 by bending alternately every time the door 105 opens and closes. Thus, elastic hook 109 and jaw 110 become gradually loose and, when the door 105 closes, the gap between the opening 103 of control box part 102 and the door 105 becomes wider. Furthermore, elastic hook 109, jaw 110, hinge part 106 and hinge 107 are broken down seriously with an increase in the number of opening/closing times and their durability is shortened accordingly.

Besides, when the door 105 opens and closes, it must be pulled and pushed inconveniently. It is also liable to being damaged by a shock given to the gap between front panel 101 and the door 105 while it is made to open momentarily by its own weight. When it opens and closes, the operation is not soft and is hard to the feel.

SUMMARY OF THE INVENTION

Consequently, the present invention, designed to find a solution to such problems as described hereinabove, is to provide a door opening/closing device intended to open and close easily and conveniently the door of an electronic appliance simply by pressing a locking-loosening button.

Another object of the present invention is to open the door softly without a shock given to the gap between the door and front panel while it is thrown momentarily Still another object of the present invention is to provide a means devised to ensure that no part of the door will be seriously worn out by opening and closing the door, that no change will occur in opening/closing operation or in a closed condition by having no fragile part subjected to a shock resulting in an increase in the number of opening/closing times which can be maintained and used semipermanently.

In order to accomplish the above stated objects, the present invention is composed of a door which opens the front opening of control box part formed in the front panel of the main body of an electronic appliance by moving to the left and closes it by moving to the right in a sliding manner; and includes a rack gear and a catching projection in its inner side and, also is provided with suspension projections which are caught by the suspension jaws on both sides of the opening when the door opens and closes, a pinion gear engaged with the rack gear of the door and provided with a pair of integrated interlocking gears, a pair of driving gears engaged with the interlocking gears and provided with a spiral spring wound onto its axis and a hook which will be caught by the catching projections of the door. On its opposite side, an interlocking part, a locker supported by a vertical axis and elastically held in a manner where the hook is caught by the catching projections of the door, a locking-loosening interlocking lever supported by a horizontal axis with its lower part coming into contact with the interlocking part of the door and a locking-loosening button which brings its front end into contact with the upper part of locking-loosening interlocking lever through a button hole bored in the front panel and holds a press axis which is caught onto the inner surface of the front panel in its middle part and escapes to the front side of the front panel at all times.

BRIEF DESCRIPTION OF THE DRAWINGS

FIG. 2 is a perspective view showing an example of electronic appliances with a door opening/closing device according to the present invention, FIG. 3 is a perspective view showing the principal part of a door opening/closing device of the present invention, FIG. 4 is a cross-sectional view showing the door opening/closing device of the present invention, FIG. 5 is a sectional view of the 5—5 line in FIG. 4, FIG. 6(A) is a plan view showing the closed state of a door opening/closing device of the present invention, and FIG. 6(B) is a plan view showing the opened state of a door opening/closing device of the present invention.

DETAILED DESCRIPTION OF THE INVENTION

Figure 1:
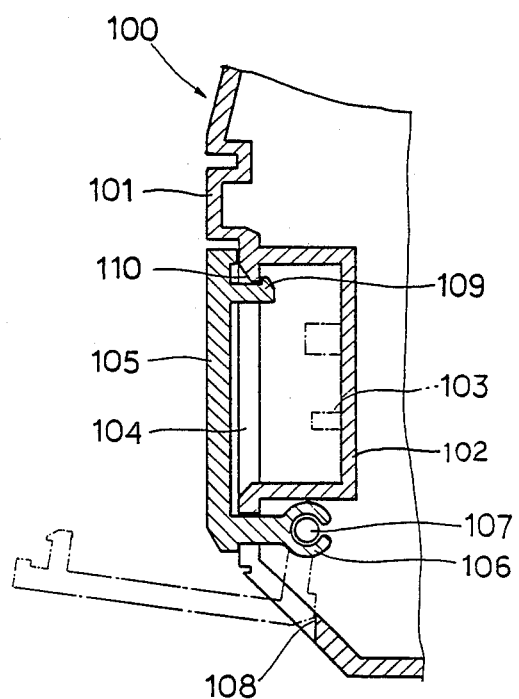
FIG. 1 is a sectional view showing the principal part of a prior door opening/closing device used for electronic appliances.

A detailed explanation of the embodiment illustrated in FIGS. 2 to 6, is as follows:

FIG. 2 shows an example of electronic appliance with a door opening/closing device according to the present invention. It illustrates a video cassette tape recorder.

The reference numeral 10 in FIGS. 2 to 6 is the main body of an electronic appliance. On one side of front panel there is formed a control box part 12 which opens from a front opening 13, and this front opening 13 opens and closes by a door 20 which slides to both sides.

The control box part 12 is provided with buttons and knobs to control various modes of an electronic appliance.

The upper and lower rims of the door 20 are inserted and guided into a guiding groove 15 which extends to both sides from the upper and lower rims of the opening 13 in the control box part 12 and the door is thereby made to be put into the guiding holes 16, 17 bored at the front ends of both walls of control box part 12.

On the inner side of the door 20 a rack gear 21 to be engaged with a pinion gear 25 and a catching projection 22 to be caught by the hook 35 of a locker 34 are formed as described hereinafter. In the catching projection 22 an inclined guiding plane 23 is formed. At one end of the outer side of the door 20 (right end in the drawing) a suspension projection 24, which is caught by the jaws 18, 19 on both sides of the opening 13 when the door opens and closes, is formed.

The suspension projection 24 of the door 20 is also used as a handle on which one's fingertip is put when the door closes.

On the one side (left side in the drawings) of control box part 12 in the interior of the main body 10 a pinion gear 25 which will be engaged with the rack gear 21 of the above door 20 is installed and a pair of interlocking gears 26 integrated with it is interlocked with a pair of driving gears 28 with a spiral spring 27 wound onto its axis 29.

The pinion gear 25 and driving gears 28 are supported by a pair of the upper and lower support plates 30 fixed on the main body 10 by axes 31, 32. The spiral spring 27 is fixed onto the axis 29 at the inner end 27a and the outer end 27b is fixed onto the fixing piece 33 fixed on the support plate 30.

The spiral spring 29 will be wound by the rotation of driving gears 28 through rack gear 21, pinion gear 25 and interlocking gears 26 when the door closes and, when the hook 35 of locker 34 is released from the catching projection 22 of the door 20 in a condition where the door 20 is closed, it will be wound off to enable the door 20 to open by the rotation of driving gears 28 through interlocking gears 26, pinion gear 25 and rack gear 21, as described hereinafter.

On the other side (right side in the drawing) of control box part 12 in the interior of the main body 10 a locker 34 provided with a hook 35 to be caught by the catching projection 22 of the door 20 is elastically installed in a manner where it is supported by a vertical axis 36 and its hook 35 is caught by a torsion spring 37 onto the catching projection 22, and a locking-loosening interlocking lever 39 with its lower end coming into contact with the opposite interlocking part 38 of hook 35 is supported by a horizontal axis 40 and a locking-loosening button 41 with its press axis 42 inserted into the button hole 45 bored in the lateral upper part of control box part 12 in the front panel 11 and its front end coming into contact with the upper end of locking-loosening interlocking lever 39 is installed so as to project from the front panel 11 at all times by means of a spring 43 which is inserted between the locking-loosening button 41 and the front panel 11.

The vertical axis 36 which supports the locker 34 is supported so as to be rotatable on a pair (only upper part is illustrated in the drawing) of the upper and lower support plates 46 fixed in the main body 10 and the horizontal axis 40 which supports the locking-loosening interlocking lever 39 is supported so as to be rotatable on a pair of the left and right support plates 47.

As to the torsion spring 37, it is installed by being wound onto the vertical axis 36 with its one end hung on the rear side of hook 35 and with its other end hung on the support plates 46.

The button hole 45 through which the press axis 42 of locking-loosening button 41 passes is bored in a groove 44 formed in the front panel 11 and the locking-loosening button 41 is installed so as to appear and disappear in the groove 44. The press spring 43 is installed so as to be hung between the inner surface of locking-loosening button 41 and the front surface of groove 44 by being wound onto the press axis 42 within the groove 44.

The torsion spring 37 is installed by being wound onto the vertical axis 36 with its one end hung on the rear side of hook 35 and with its other end hung on the support plates 46.

The button hole 45 through which the press axis 42 of locking-loosening button 41 passes is bored in a groove 44 formed in the front panel 11 and the locking-loosening button 41 is installed so as to appear and disappear in the groove 44. The press spring 43 is installed so as to be hung between the inner surface of locking-loosening button 41 and the front surface of groove 44 by being wound onto the press axis 42 within the groove 44.

On the press axis 42 of locking-loosening button 41 a stopper 48 to be hung on the rear side of groove 44 is installed to prevent the locking-loosening button 41 from coming off.

The element 49 is a door which opens and closes the cassette tape insertion mouth of a video cassette tape recorder illustrated as an example of electronic appliances.

In the operation, the locker 34 supported by the said vertical axis 36 is elastically held in a manner where the said hook 35 is caught by the said catching projection 22 of the said door 20 and the upper part front of locking-loosening interlocking lever 39 with its lower part coming into contact with the interlocking part 38 of locker 34 is accordingly brought into contact with the front end of the press axis 42 of locking-loosening button which always projects forwardly from the groove 44 of front panel 11 by means of press spring 43.

Namely, the press axis 42 of the said locking-loosening button 41 and the locking-loosening interlocking lever 39 are also used as a stopper which prevents the locker 34 from making more turns.

As shown in FIG. 6(B) in a condition where the opening 13 of control box part 12 is open with its door open, the door 20 is kept with its rack gear 21 engaged with pinion gear 25 and with suspension projection 24 caught by the jaw 18 on the one side of the opening 13. When the door 20 is pulled to the right (in the drawing) by putting one's fingertip on the said suspension projection 24 under such a condition, it moves along the groove 15 which extends to the left and right of the upper and lower rims of the said opening 13 and, when the said catching projection 22 reaches the hook 35 of locker 34, the hook 35 is brought into contact with its inclined guiding plane 23 and pushed. Thus, when the catching projection 22 passes the hook 35, the locker 34 returns by means of torsion spring 37 and, as shown in FIG. 6(A), the catching projection 22 is caught and locked by the hook 35 and the door 20 is kept with a part of suspension projection 24 caught by the right suspension jaw 19 and with the opening 13 of control box part closed.

As the door 20 moves in the course of closing, the pinion gear 25 engaged with rack gear 21 and the driving gears 28 engaged with interlocking gears 26 formed in a body with pinion gear 25 are made to rotate. Then, the spiral spring 27 fixed on the fixing piece 31 will be wound with its inner end 27a fixed onto the axis 29 and its outer end 27b fixed on the main body 10. Subsequently, the force which enables the door with its rack gear 21 engaged with pinion gear 25 to rotate in an openable direction will be applied to the driving gears 28 and pinion gear 25 by the elastic force of spiral spring 27. However, as the door 20 is locked by the locker 34 at this time, it will not open.

As shown in FIG. 6(A), when the locking-loosening button 41, which elastically projects forwardly from the groove 44 of front panel 11 at all times by means of press spring 43 is pressed, the upper end of locking-loosening interlocking lever 39 is pressed by the front end of its press axis 42 and the locking-loosening interlocking lever 39 is thereby made to rotate. Then, its lower end pushes the interlocking part 38 of locker 34 forwardly and rotates the locker 34. Thus, locking is loosened with the hook 35 of locker 34 coming off from the catching projection 22 of the door 20.

When the locking of the said door 20 is loosened, the driving gear 28 to which the force enabling the door 20 to rotate in an openable direction is applied by the spiral spring 27 is made to rotate and, with the rotation of pinion gear 25 through interlocking gear 26, the rack gear 21 engaged therewith is pulled in a manner where the door 20 opens and the door 20 moves to the left (in the drawing) along the said guiding groove 15 and the opening 13 of the said control box part 12 is thereby made to open. Then, it is kept open in a condition where the suspension projection 22 is caught by the jaw 18 on the one side of the opening 13.

As to the spiral spring 27 for the door to close, it will be unwound relatively strongly and quickly in its initial unwinding stage and relatively weakly and slowly in its last unwinding stage when it is unwound from a wound condition. So, the door 20 which opens by the unwinding force of spiral spring 27 will open at a relatively fast speed in its initial opening stage but at a gradually slow speed in its last opening stage and, when the suspension projection 24 is caught by the suspension jaw 18, it suspends softly without giving a shock.

According to the door opening/closing device of the present invention, the door 20 is installed in a sliding manner and, when it is closed, it will be closed by being pushed with one's fingertip put on the suspension projection 24. When the door 20 is opened, the door 20 with rack gear 21 engaged with pinion gear 25 is made to open automatically with the rotation of driving gears 28, interlocking gears 26 and pinion gear 25 by the unwinding force of spiral spring 27 which is wound onto the axis 29 in a process where the door 20 is closed simply by releasing the hook 35 of locker 34 from the catching projection 22 of the door 20 with a push to the locking-loosening button 41. Thus, opening and closing of the door 20 becomes very convenient.

Furthermore, when the door 20 is opened and closed, no differential shock is given to between the door 20 and the main body 10 and no part thereof bends or wears away. In particular, when the door 20 is opened automatically by the unwinding force of spiral spring 27, it will open quickly as the spiral spring 27 is unwound relatively quickly in the initial opening stage but it will open gradually as the spiral spring is unwound gradually slowly and weakly in the last opening stage. So, the door 20 is openable without giving a shock to between the door 20 and the main body 10 and durability will be prolonged accordingly.

Although an explanation of the above embodiment is given as an example of the application of the present invention to a video cassette tape recorder, the present invention is not limited thereto. It is applicable to all types of electronic appliances and modifiable in a diversified manner within its technical scope.

What is claimed is:

1. A door opening and closing device for an electronic appliance which comprises:
   a horizontally movable door having a raised portion disposed at one end and a rack gear disposed at the other end thereof,
   a pivotal V-shaped lever having a projecting member disposed at one end for slidably locking with said raised portion and a connecting portion disposed at the other end thereof,
   a support connected to said connecting portion at one end thereof,
   a button biased by a spring and connected to the other end of said support,
   a pinion gear operatively connected with said rack gear and having a pair of coaxial first driving gears, and
   a connecting shaft wound by a spiral spring having coaxial second driving gears operatively connected with said first driving gears, whereby upon pushing the button, the raised portion of the door is released from the projecting member and the spiral spring causes rotation of the connecting shaft which results in rotation of the first and second driving gears and rotation of the pinion gear which meshes with the rack gear and causes the door to slide toward the first and second gears to an open position.

2. The door opening and closing device of claim 1, wherein the door is inserted into a groove which extends to the left and right of the upper and lower rims of an opening disposed in a control box portion of the electronic appliance.

3. The door opening and closing device of claim 1, wherein the spiral spring is wound onto the connecting shaft of said second driving gears and has an inner end fixed onto said connecting shaft and an outer end onto a main body of the electronic appliance.

* * * * *